US011422970B2

(12) United States Patent
Haberkorn et al.

(10) Patent No.: US 11,422,970 B2
(45) Date of Patent: Aug. 23, 2022

(54) HANDLING OF DATA ARCHIVING EVENTS IN A REPLICATION SYSTEM

(71) Applicant: SAP SE, Walldorf (DE)

(72) Inventors: Michael Haberkorn, Bad Schoenborn (DE); Peter Haehner, Wiesloch (DE)

(73) Assignee: SAP SE, Walldorf (DE)

( * ) Notice: Subject to any disclaimer, the term of this patent is extended or adjusted under 35 U.S.C. 154(b) by 127 days.

(21) Appl. No.: 16/871,242

(22) Filed: May 11, 2020

(65) Prior Publication Data

US 2021/0349849 A1    Nov. 11, 2021

(51) Int. Cl.
| | | |
|---|---|---|
| *G06F 16/11* | (2019.01) | |
| *G06F 16/27* | (2019.01) | |
| *G06F 16/23* | (2019.01) | |
| *G06Q 10/10* | (2012.01) | |

(52) U.S. Cl.
CPC ........ *G06F 16/113* (2019.01); *G06F 16/2379* (2019.01); *G06F 16/273* (2019.01); *G06Q 10/10* (2013.01)

(58) Field of Classification Search
CPC .. G06F 16/113; G06F 16/273; G06F 16/2379; G06Q 10/10
See application file for complete search history.

(56) References Cited

U.S. PATENT DOCUMENTS

| | | | | |
|---|---|---|---|---|
| 8,214,338 | B1 * | 7/2012 | Kirchhoff | G06F 16/113 |
| | | | | 707/693 |
| 2010/0106753 | A1 * | 4/2010 | Prabhakaran | G06F 3/065 |
| | | | | 707/818 |
| 2013/0318044 | A1 * | 11/2013 | Pareek | G06F 16/27 |
| | | | | 707/635 |
| 2016/0350357 | A1 * | 12/2016 | Palmer | G06F 16/2365 |
| 2019/0171721 | A1 * | 6/2019 | Oukid | G06F 16/2329 |

* cited by examiner

*Primary Examiner* — Alford W Kindred
*Assistant Examiner* — Lin Lin M Htay
(74) *Attorney, Agent, or Firm* — Buckley, Maschoff & Talwalkar LLC (57) ABSTRACT

Systems and methods include detection of deletion of a record of a database table due to a database transaction, creation of a log entry including one or more key field values of the record of the database table, an identifier of a user associated with the database transaction, and an indicator of a delete operation, determination of whether the identifier identifies an archiving user, and, in a case that the identifier identifies an archiving user, change the indicator to an indicator of an archive operation to create a changed log entry.

15 Claims, 8 Drawing Sheets

| Sequence ID | Timestamp | Client ID | Document ID | Operation | User |
|---|---|---|---|---|---|
|  |  |  |  |  |  |
|  |  |  |  |  |  |
|  |  |  |  |  |  |

| Client ID | Document ID | Sequence ID | Timestamp | Operation | User |
|---|---|---|---|---|---|
|  |  |  |  |  |  |
|  |  |  |  |  |  |
|  |  |  |  |  |  |

HANDLING OF DATA ARCHIVING EVENTS IN A REPLICATION SYSTEM

BACKGROUND

Conventional database systems store large volumes of data related to many aspects of an enterprise. It is often desirable to mirror respective portions of the data stored in one system (i.e., a source system) within one or more other systems (i.e., target systems). For example, it may be desirable to mirror a portion of data stored in a source system which is particularly suited for data acquisition and storage within a target system which is particularly suited for data analysis.

A replication server may be used to create and update target tables in a target system which mirror respective source tables in a source system. Database triggers executing on the source system may identify and log changes which occur to specified source tables. A replication server accesses the logging tables and applies the changes to corresponding target tables.

Data archiving involves the movement of historical data from a source system into a revision-safe data storage, typically to free up space in the source system. Accordingly, the historical data is deleted from the source system once it has been safely moved. However, if corresponding database tables have been selected for replication, the data archiving event is identified as a deletion of the historical data and the replication system operates to delete this data in the target system.

To handle such archiving, the above-described database triggers identify whether deletions are performed by special archiving users and, if so, either ignore these deletions, process them as a typical data deletion, or process them as an update. Handling data archiving inside the database triggers negatively impacts the processing of data transactions. Such handling also requires all change log subscribers to process all data archiving deletions in a same manner.

However, some subscribers may desire to delete archived data in their target systems, while other subscribers may desire to maintain archived data in their target systems. In addition to individualized processing, it may be desired to centrally deactivate the logging of data deletions which are initiated by data archiving events, which would reduce the number of records which are captured by the database triggers and stored in the logging tables.

DETAILED DESCRIPTION

The following description is provided to enable any person in the art to make and use the described embodiments. Various modifications, however, will remain readily-apparent to those in the art.

Generally, some embodiments move the data archiving handling of a subscription-based replication mechanism from database triggers to subscriber-specific data reconstruction and transfer processes. Such movement may improve the processing of database transactions and allow subscriber-specific processing of archived data. Some embodiments further provide an option to centrally deactivate the capture of data deletions initiated by data archiving events.

Figure 1:
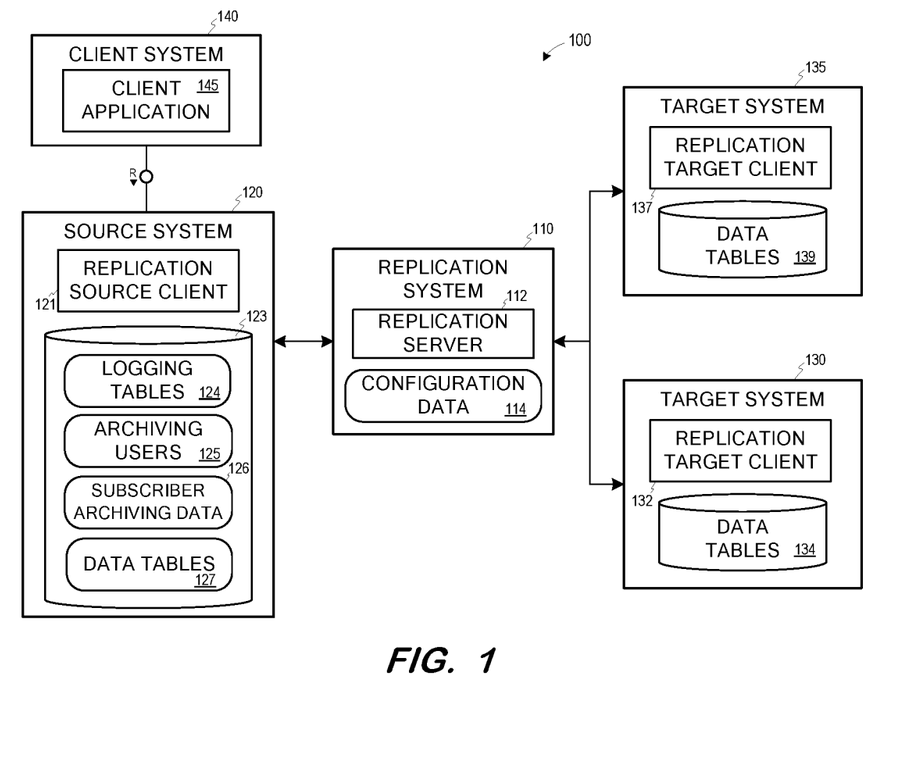
FIG. 1 is a replication architecture according to some embodiments.

FIG. 1 illustrates system 100 according to some embodiments. System 100 includes replication system 110 for replicating data from source system 120 into target systems 130 and 135. Although FIG. 1 illustrates one source system and two target systems, in some embodiments replication system 110 may replicate data from any number of source systems to any number of target systems.

Generally, replication system 110 may execute replication server 112 based on configuration data 114 to maintain a replica of one or more tables 127 of source system 120 in tables 134 of target system 130 and/or tables 134 of target system 130. Configuration data 114 may specify particular objects (e.g., tables) of a particular source system to be replicated in one or more particular target systems. Configuration data 114 may also specify target-specific (or, more specifically, configuration-specific) data handling parameters, such as parameters specifying whether to delete source-archived records from corresponding target tables, mark the records as archived, and/or perform other actions.

Client device system 140 executes client application 145 to communicate with source system 120. Client application 145 may comprise code executing within a Web browser executed by client system 140 according to some embodiments. Client application 145 may comprise a business application which accesses data of data tables 127. Such access may include inserting new records, updating existing records or deleting existing records of data tables 127. Client application 145 may also or alternatively provide data archiving functionality to move selected records of data tables 127 to an archive data storage (not shown).

Source system 120 may execute replication source client 122 to record changes to configuration-specified ones of tables 127 in logging tables 124. Replication server 112 may check for such changes and provide any changes to appropriate ones of tables 134 or tables 139 via replication target client 132 or replication target client 137.

According to some embodiments, and as will be described in more detail below, replication source client 121 includes database triggers to detect insert, update and delete operations which are performed on records of configuration-specified ones of data tables 127 during database transactions. In some embodiments, an individual database trigger is created for each operation on each specified table. The database triggers record the detected operations as log entries of logging tables 124.

As will be described in detail below, logging tables 124 may include, for each database record affected by a database transaction, a log entry specifying the key field values of the database record, the type of operation performed on the record, and an indicator of the user associated with the database transaction. Replication source client 121 may further include an observer process which reads the log entries and writes similar log entries into subscriber logging tables respectively associated with each subscriber.

Source system 120 also maintains a list of archiving users 125. For each log entry specifying a delete operation and a user who is listed in archiving users 125, the observer process may change the specified operation to an "archiving" operation prior to storing the entry in the corresponding subscriber logging table.

Moreover, replication source client 121 may include a data reconstruction and transfer process which reads a subscriber logging table and provides the changed data and specified operation to a subscriber based on subscriber archiving data 126. For example, subscriber archiving data 126 may specify that archived data is to be deleted in the target system of a first subscriber, and that archived data is to remain in the target system of a second subscriber. Accordingly, the data reconstruction and transfer process would return data specified as archived in the subscriber logging table of the first subscriber as a regular deletion operation, and would return data specified as archived in the subscriber logging table of the second subscriber with, e.g., the operation 'A'. This process thereby allows subscribers to then implement individual handling of the returned data as they choose.

The data stored within tables 127, tables 134 and tables 139 may comprise one or more of conventional tabular data, row-based data, column-based data, and object-based data. According to some embodiments, replication server 112 operates to perform any transformations necessary to convert data from a format of tables 127 to a format of tables 134 or tables 139. The data may be distributed among several relational databases, dimensional databases, and/or other data sources.

Each of source system 120, target system 130 and target system 135 may comprise any computing system capable of executing a database management system, of storing and independently managing data of one or more tenants and, in some embodiments, of supporting the execution of database server applications. Each of source system 120, target system 130 and target system 135 may include a distributed storage system and/or distributed server nodes for performing computing operations as is known in the art. According to some embodiments, source system 120 is an on-premise transactional database system, target system 130 is an in-memory database system configured to provide data analytics, and target system 135 is a data warehousing system, but embodiments are not limited thereto. In this regard, a client application (not shown) may communicate with one or more server applications (not shown) executing on target system 130 to perform data analytics on data stored in tables 134.

Source system 120, target system 130 and target system 135 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120, target system 130 and target system 135 may store data in Random Access Memory (e.g., cache memory for storing recently-used data) and one or more fixed disks (e.g., persistent memory for storing their respective portions of the full database).

Figure 2:
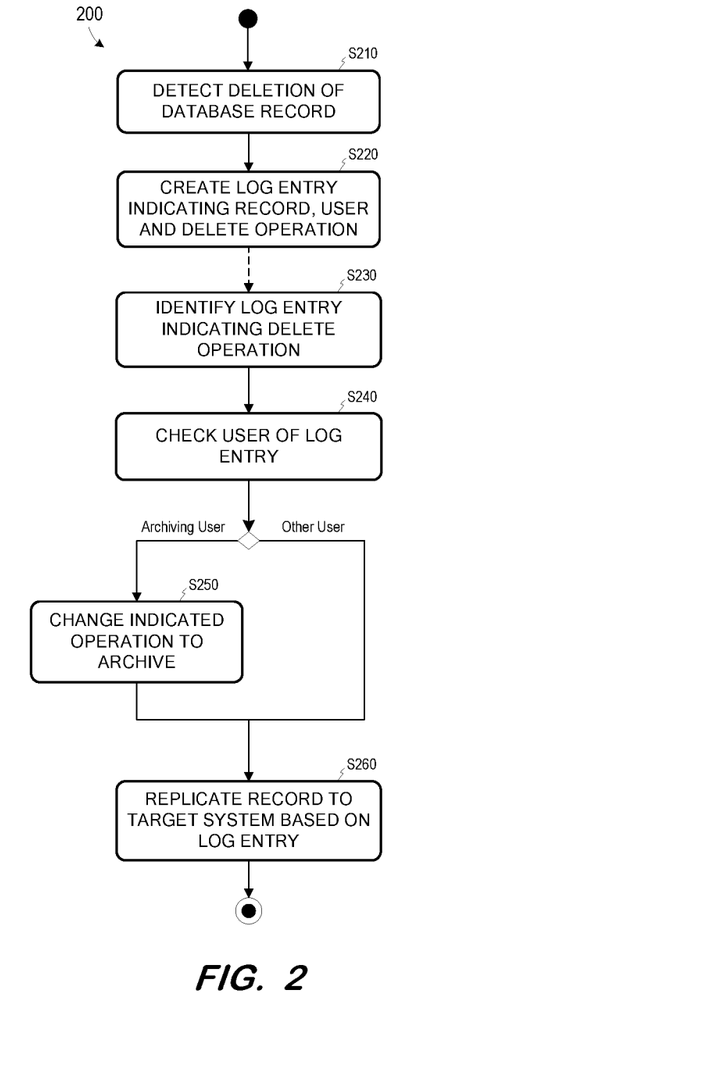
FIG. 2 is a flow diagram of a process to handle data archiving events according to some embodiments.

FIG. 2 illustrates process 200 to handle deletion operations according to some embodiments. Process 200 will be described with respect to the example of FIG. 1 but embodiments are not limited thereto.

Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

According to some embodiments, replication source client 121 may execute process 200 continuously during data replication. Initially, deletion of a record of a database table is detected at S210. The deletion may be caused by an archiving process which archives the record, or by a business transaction which deletes the record. The archiving process or business transaction is associated with a user who initiated the process. As described above, the deletion may be detected at S210 by a database trigger which is associated with deletions of records of the database table.

A log entry is created at S220, for example by the database trigger. The log entry indicates the deleted record (e.g., using the key field values of the record), an identifier of the user and an indication of the delete operation. The log entry may be stored in a master logging table of the source system.

Database triggers may then continue to create and store log entries in the master logging table. These entries may be associated with deleted records and/or created and updated records. At some point an observer process of replication source client 121 may read the master logging table to generate records of one or more corresponding subscriber logging tables. For example, at S230, a log entry of the master logging table is identified which indicates a delete operation.

S240 includes checking the identity of the user associated with the identified log entry. The identity is compared against stored list of archiving users 125. If the user is among the list of archiving users 125, the operation indicated by the log entry is changed from a delete operation to an archiving operation (e.g., from "D" to "A") at S250. The changed log entry may then be stored in a subscriber logging table corresponding to a subscriber to the database table.

Next, at S260, the deleted record corresponding to the log entry is replicated to a target system based on the log entry. For example, the data record may be specified as deleted and transferred to a replication system if the corresponding subscriber intends to treat archiving events as deletion events. Alternatively, the data record may be specified as archived and then transferred, allowing the replication system to, for example, annotate the record in the corresponding table of the target system. S260 thereby allows subscribers to implement individual handling of the returned data as they choose.

Figure 3:
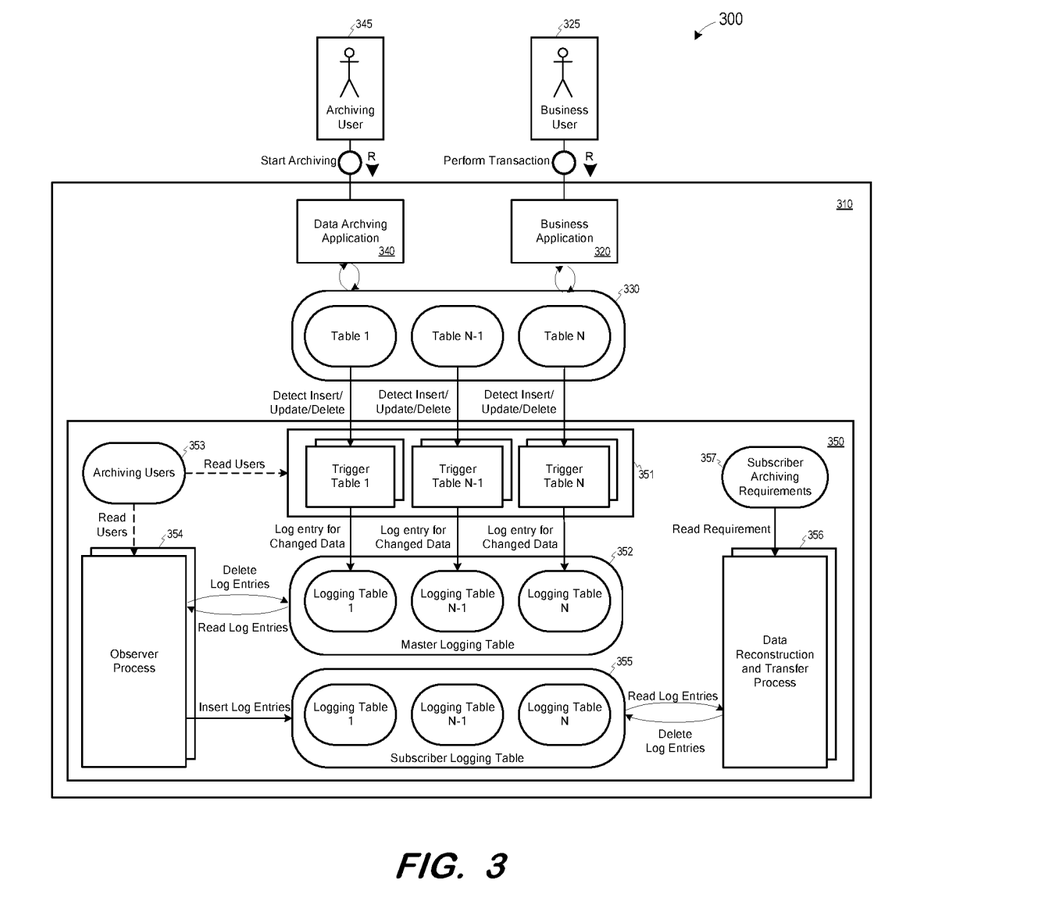
FIG. 3 is a block diagram of a change data capture engine according to some embodiments.

FIG. 3 illustrates system 300 according to some embodiments. System 300 may comprise an implementation of system 100 but embodiments are not limited thereto.

Source system 310 includes business application 320 for accessing data tables 1-N stored in database 330. Business user 325 may interact with application 320 to perform business transactions which result in inserting, updating and deleting records of one or more of data tables 1-N of database 330.

Archiving user 345 may access data archiving application 340 to move data records from tables 1-N to an external storage (not shown). The data records may include historical data which may no longer be needed during day-to-day business transactions performed by a business user such as user 325. Archiving user 345 comprises a particular system user included in a predefined list of archiving users, which assists in identifying deletions performed by data archiving application as data archiving events.

Change data capture engine 350 of source system 310 includes database triggers 351. A plurality of database triggers 351 are created for each database table 1-N to capture any insert, update or delete operations on any records of the database tables. A database trigger 351 creates a log entry for any detected operation and saves the log entry in a master logging table 352 associated with the corresponding database table.

Figure 4:
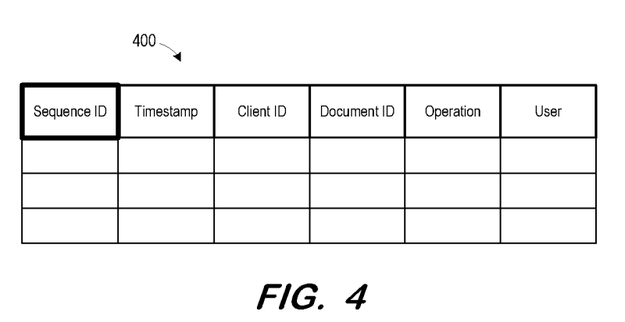
FIG. 4 is a tabular representation of a master logging table according to some embodiments.

As shown in FIG. 4, a log entry of example master logging table 400 includes the key field values of the changed data record (e.g., client ID and document ID), an identifier of the user, an operation identifier (e.g. insert, update or delete), a sequence ID and a timestamp. The sequence ID is set by the database trigger when the record is inserted into the master logging table 400. The timestamp is used to identify a time at which the respective change was captured by the database trigger. The user identifier may be retrieved from a session context variable in some embodiments. According to some embodiments, the database trigger creates a log entry and saves it in the associated master logging table 352 irrespective of whether business application 320 or data archiving application 340 performed the transaction which resulted in the operation.

In some embodiments, upon detecting a delete operation, a database trigger accesses (as denoted by a dashed arrow) archiving users list 353 to determine whether the associated user is a designated archiving user. If so, no log entry corresponding to the delete operation is created in any master logging table 352. This option, if invoked, allows for a global setting in which no archiving-initiated deletions are logged or provided to any sub scribers.

Figure 5:
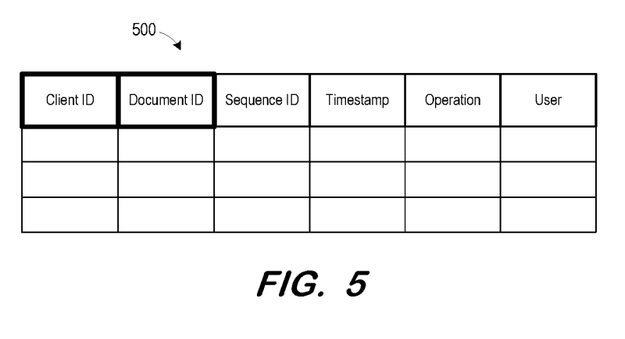
FIG. 5 is a tabular representation of a subscriber logging table according to some embodiments.

Observer process 354 monitors the entries of master logging tables 352 and copies information from the entries into respective log entries of subscriber logging tables 355. FIG. 5 illustrates subscriber logging table 500 for storing log entries including the information from respective log entries of master logging table 400. Entries are copied (and then deleted) from master logging tables 352 only after the corresponding business transaction has been committed.

During the above-mentioned copying, and according to some embodiments, observer process 354 reads list 353 of archiving users to determine whether any log entries indicating a delete operation also indicate a user listed in list 353. If so, the operation field of these entries is changed (e.g., overwritten with value 'A') to indicate an archiving operation prior to copying the record to the corresponding subscriber logging table.

Data reconstruction and transfer process 356 reads the entries of logging tables 355 and provides corresponding reconstructed data (via the key fields of logging tables 355) and an operation identifier to subscribers. Process 356 accesses subscriber archiving requirements 357 to determine how to process archived data for each subscriber. As described above, the archiving requirement of a subscriber may indicate that archived data shall be deleted in the target system of the subscriber (in which case the reconstructed data record is returned with the operation identifier 'D' as is done with any deletion operation), or that the archived data shall remain in the target system of the subscriber (in which case the reconstructed data record is returned with the operation identifier 'A' so that the subscriber may, if desired, indicate the data record as archived in the target system).

Figure 6:
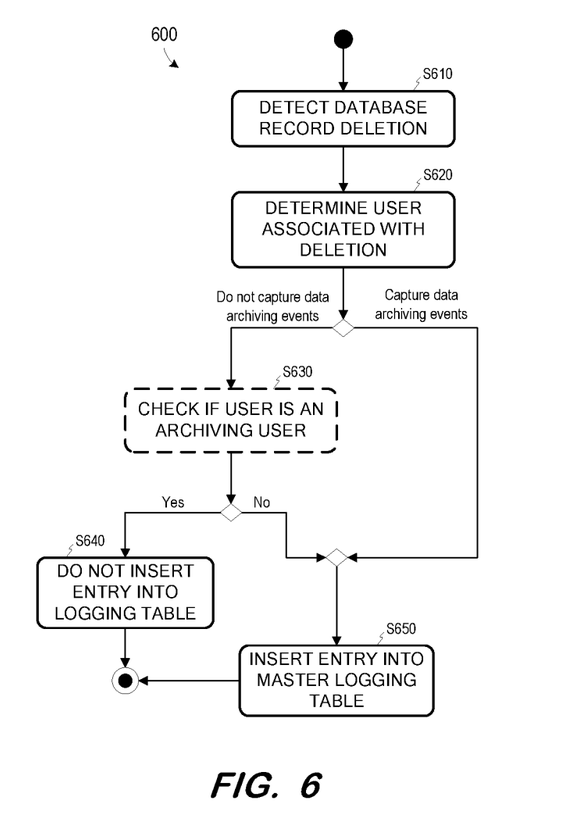
FIG. 6 is a flow diagram of a process for a database trigger of a change data capture engine to handle data archiving events according to some embodiments.

FIG. 6 is a flow diagram of process 600 for execution by a database trigger according to some embodiments. Initially, at S610, deletion of a record of a database table is detected by a database trigger configured to capture delete operations on the database table. A user associated with the deletion is determined at S620. The determined user is the user who executed the database transaction which resulted in the deletion.

Flow proceeds to S630 if the source system is configured to ignore data archiving events during the replication process. At S630, the database trigger accesses a list of archiving users to determine whether the determined user is a designated archiving user. If so, no log entry corresponding to the delete operation is inserted in any logging table. Accordingly, the replication server is unaware of the occurrence of the deletion operation and the corresponding record is maintained in the corresponding database table of the target system.

If the user is not an archiving user, a log entry corresponding to the deletion is created and inserted into the above-described master logging table at S650. The log entry may include a sequence ID, a timestamp, the key field values of the changed data record, an identifier of the user, and an identifier of the delete operation identifier. Similarly, flow proceeds from S620 to S650 to insert an entry in the master logging table if the source system is configured to log data archiving events.

Figure 7:
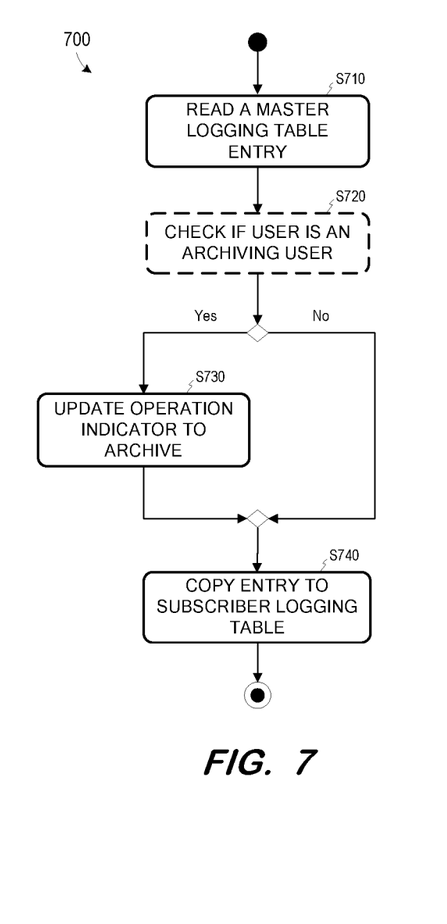
FIG. 7 is a flow diagram of a process for an observer process of a change data capture engine to handle data archiving events according to some embodiments.

FIG. 7 is a flow diagram of process 700 for execution by an observer process to populate a subscriber logging table according to some embodiments. The observer process reads a master logging table entry associated with a committed delete operation at S710. If the source system is configured to log data archiving events, it is then determined at S720 whether the user indicated in the entry is an archiving user. If the user is an archiving user, the operation indicator of the entry is updated at S730 to indicate an archive (rather than a delete) operation. The entry is then copied to the corresponding subscriber logging table at S740. If the user is not an archiving user, or if the source system is globally configured to not log data archiving events during replication, flow simply proceeds from S720 or S710, respectively, to copy the read entry to the corresponding subscriber logging table.

Figure 8:
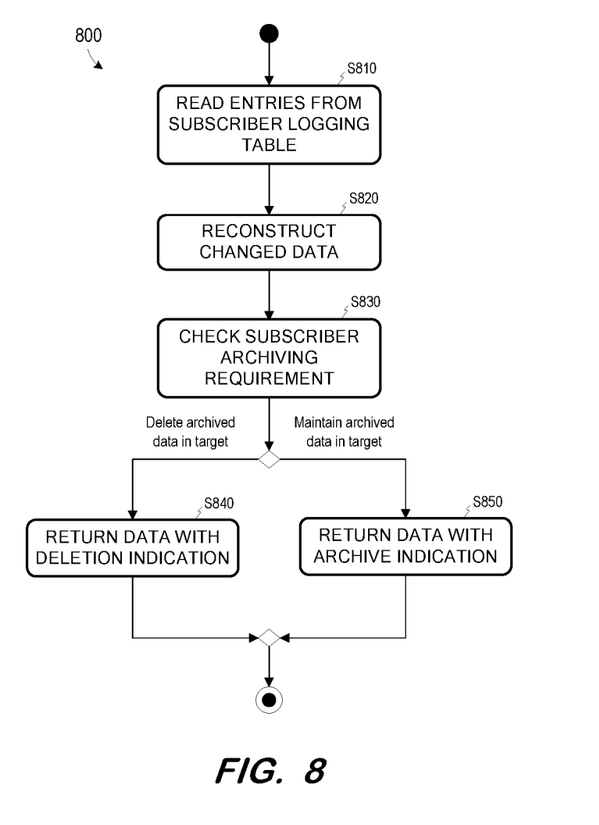
FIG. 8 is a flow diagram of a process for data reconstruction and transfer process of a change data capture engine to handle data archiving events according to some embodiments.

FIG. 8 is a flow diagram of process 800 for execution by a data reconstruction and transfer process to provide reconstructed data to a subscriber according to some embodiments. At S810, entries from the subscriber logging table are read and the corresponding changed data are retrieved and reconstructed at S820 using the key field values of the entries. In the case of deleted data, archiving requirements of associated subscribers are checked at S830.

If the archiving requirement indicates that archived data shall be deleted in the target system of the subscriber, the reconstructed data record is returned at S840 with an operation identifier indicating a deletion operation. If the archiving requirement indicates that the archived data shall remain in the target system of the subscriber, the reconstructed data record is returned at S850 with an operation identifier 'A' indicating an archiving operation. In the latter case, the target system may be updated to indicate the archived status of the data record.

Figure 9:
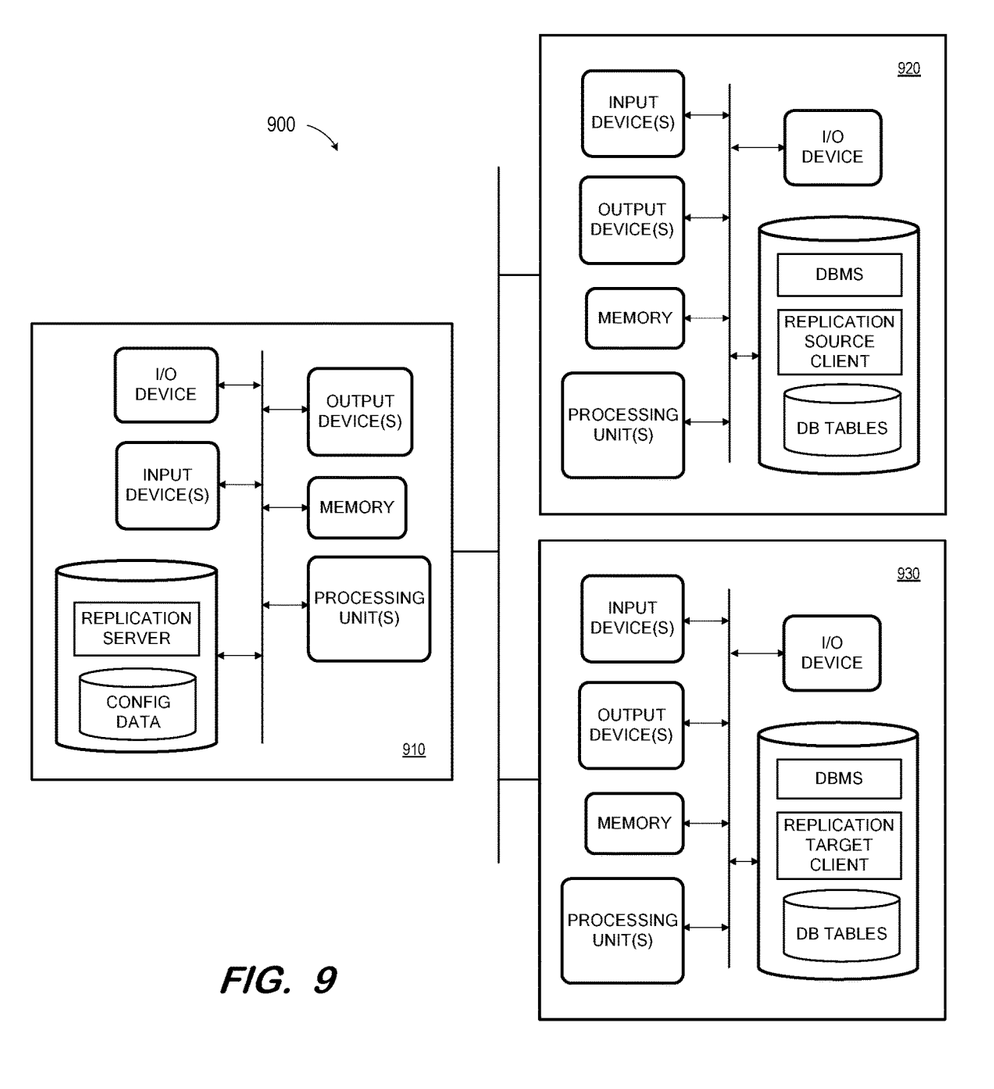
FIG. 9 is a block diagram of computing devices comprising a replication architecture for according to some embodiments.

FIG. 9 is a block diagram of system 900 according to some embodiments. System 900 includes replication system 910, which may comprise an implementation of replication system 110. Similarly, source system 920 may comprise an implementation of source system 120 or 310 and target system 930 may comprise an implementation of target system 130 or 135. According to some embodiments, replication system 910 may communicate simultaneously with many source systems and target systems to perform replication of objects as described herein. Each of systems 910, 920 and 930 may comprise a general-purpose computing apparatus and may execute program code using processing unit(s) to perform any of the functions described herein. Each of systems 910, 920 and 930 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code;
a processing unit to execute the processor-executable program code to cause the system to:
detect deletion of a record of a database table due to a database transaction;
create a log entry including one or more key field values of the record of the database table, an identifier of a user associated with the database transaction, and an indicator of a delete operation;
store the log entry in a subscriber logging table associated with a subscriber;
reconstruct the record based on the one or more key field values of the log entry;
determine that the log entry includes the indicator of the delete operation;
in response to the determination that the log entry includes the indicator of the delete operation, determine whether archived records are to be deleted in a target system associated with the subscriber; and
if it is determined that archived records are to be deleted in the target system, transmit the reconstructed record and a deletion indicator to the subscriber.

2. A system according to claim 1, wherein the log entry is stored in a master logging table, the processor-executable process steps further to cause the system to:
determine the user associated with the database transaction.

3. A system according to claim 2, the processor-executable program code further to cause the system to:
prior to creation of the log entry, determine whether archive operations are to be logged and,
create the log entry if it is determined that archive operations are to be logged.

4. A system according to claim 1, the processor-executable program code further to cause the system to:
prior to creation of the log entry, determine whether archive operations are to be logged; and
create the log entry if it is determined that archive operations are to be logged.

5. A system according to claim 1, wherein, in a case that archived records are to be maintained in the target system, the reconstructed record is returned in association with the indicator of an archive operation or update operation.

6. A computer-implemented method comprising:
detecting deletion of a record of a database table due to a database transaction;
creating a log entry including one or more key field values of the record of the database table, an identifier of a user associated with the database transaction, and an indicator of a delete operation;
storing the log entry in a subscriber logging table associated with a subscriber;
reconstructing the record based on the one or more key field values of the log entry;
determining that the log entry includes the indicator of the delete operation;
in response to determining that the log entry includes the indicator of the delete operation, determining whether archived records are to be deleted in a target system associated with the subscriber; and
if it is determined that archived records are to be deleted in the target system, transmitting the reconstructed record and a deletion indicator to the subscriber.

7. A method according to claim 6, wherein the log entry is stored in a master logging table, the method further comprising:
determining the user associated with the database transaction..

8. A method according to claim 7, the method further comprising:
prior to creation of the log entry, determining whether archive operations are to be logged and,
creating the log entry if it is determined that archive operations are to be logged.

9. A method according to claim 6, the method further comprising:

prior to creation of the log entry, determining whether archive operations are to be logged; and creating the log entry if it is determined that archive operations are to be logged.

10. A method according to claim 6, wherein, in a case that archived records are to be maintained in the target system, the reconstructed record is returned in association with the indicator of an archive operation or an update operation.

11. A system comprising:

a source database system storing a database table, the source database system to:

detect deletion of a record of the database table due to a database transaction;

create a log entry including one or more key field values of the record of the database table, an identifier of a user associated with the database transaction, and an indicator of a delete operation;

store the log entry in a subscriber logging table associated with a subscriber;

reconstruct the record based on the one or more key field values of the log entry;

determine that the log entry includes the indicator of the delete operation;

in response to the determination that the log entry includes the indicator of the delete operation, determine whether archived records are to be deleted in a target system associated with the subscriber; and if it is determined that archived records are to be deleted in the target system, transmit the reconstructed record and a deletion indicator to the subscriber.

12. A system according to claim 11, wherein the log entry is stored in a master logging table, the source database system to:

determine the user associated with the database transaction.

13. A system according to claim 12, the source database system to:

prior to creation of the log entry, determine whether archive operations are to be logged and, create the log entry if it is determined that archive operations are to be logged.

14. A system according to claim 11, the source database system to:

prior to creation of the log entry, determine whether archive operations are to be logged; and create the log entry if it is determined that archive operations are to be logged.

15. A system according to claim 11, wherein, in a case that archived records are to be maintained in the target system, the reconstructed record is returned in association with the indicator of an archive operation or update operation.

* * * * *